(12) United States Patent
Terwilliger et al.

(10) Patent No.: US 12,071,257 B2
(45) Date of Patent: Aug. 27, 2024

(54) HYBRID ELECTRIC HYDROGEN ENGINE FOR AIRCRAFT

(71) Applicant: RTX Corporation, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/860,733

(22) Filed: Jul. 8, 2022

(65) Prior Publication Data
US 2024/0010350 A1    Jan. 11, 2024

(51) Int. Cl.
*B64D 37/30*    (2006.01)
*B64D 37/34*    (2006.01)
*B64D 41/00*    (2006.01)
*F02D 41/00*    (2006.01)

(52) U.S. Cl.
CPC ............ *B64D 37/30* (2013.01); *B64D 37/34* (2013.01); *F02D 41/0027* (2013.01); *B64D 2041/005* (2013.01)

(58) Field of Classification Search
CPC .. B64D 37/30; B64D 37/34; B64D 2041/005; F02D 41/0027
See application file for complete search history.

(56) References Cited

U.S. PATENT DOCUMENTS

| | | | | |
|---|---|---|---|---|
| 5,106,035 | A * | 4/1992 | Langford, III | B64D 27/24 244/62 |
| 9,932,124 | B2 * | 4/2018 | Kamath | F02C 9/40 |
| 11,047,307 | B2 * | 6/2021 | Roberge | F02C 3/22 |
| 2014/0023945 | A1 * | 1/2014 | Epstein | B64D 37/30 429/513 |

(Continued)

FOREIGN PATENT DOCUMENTS

| | | | | |
|---|---|---|---|---|
| CN | 101201176 B * | 5/2012 | | F23D 14/62 |
| EP | 3048281 A1 | 7/2016 | | |
| EP | 3845747 A1 * | 7/2021 | | B64D 31/14 |

OTHER PUBLICATIONS

Machine Translation of CN101201176B PDF File Name: "CN101201176B_Machine_Translation.pdf".*

(Continued)

*Primary Examiner* — Grant Moubry
*Assistant Examiner* — Ruben Picon-Feliciano
(74) *Attorney, Agent, or Firm* — CANTOR COLBURN LLP

(57) ABSTRACT

Aircraft engine systems include a core assembly having at least a burner section and a fuel cell configured to generate electrical power. A cryogenic fuel source is configured to supply a fuel through a fuel supply line to each of the burner section and the fuel cell for reaction to generate the electrical power. A system controller is configured to direct fuel to each of the combustor section and the fuel cell. The controller determines if an amount of fuel in the fuel supply line is in excess of that necessary for operation of the core assembly and, based on a determination that excess fuel is present, the controller is configured to direct at least a portion of the excess fuel from the fuel supply line to the fuel cell to generate the electrical power.

14 Claims, 4 Drawing Sheets

(56) References Cited

U.S. PATENT DOCUMENTS

2014/0087283 A1* 3/2014 Stolte .................. H01M 8/249
                                                          429/444
2020/0088098 A1* 3/2020 Roberge ................. F02C 7/16
2021/0207540 A1   7/2021 Roberge
2021/0300575 A1   9/2021 Staubach et al.
2022/0336829 A1* 10/2022 Miftakhov ............... B64F 1/28

OTHER PUBLICATIONS

Bradley, "Identification and Descriptions fo Fuel Cell Architectures for Aircraft Applications", 2022 IEEE, 4 pages.
European Search Report for European Application No. 2318426539; Date of Action: Nov. 17, 2023, 8 pages.

* cited by examiner

HYBRID ELECTRIC HYDROGEN ENGINE FOR AIRCRAFT

TECHNICAL FIELD

The present disclosure relates generally to turbine engines and aircraft engines, and more specifically to hybrid electric, hydrogen aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, a liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft engine systems are provided. The aircraft engine systems include a core assembly comprising a compressor section, a burner section, and a turbine section arranged along a shaft, with a core flow path through the core assembly such that exhaust from the burner section passes through the turbine section and exits through a nozzle; a fuel cell configured to generate electrical power; a cryogenic fuel source configured to supply a fuel through a fuel supply line to each of the burner section for combustion and the fuel cell for reaction to generate the electrical power; and a system controller configured to selectively direct the fuel from the cryogenic fuel source to each of the combustor section and the fuel cell, wherein the system controller is configured to: determine if an amount of fuel in the fuel supply line is in excess of that necessary for operation of the core assembly; and based on a determination that excess fuel is present, the system controller is configured to direct at least a portion of the excess fuel from the fuel supply line to the fuel cell to generate the electrical power.

In addition to one or more of the features described above, or as an alternative, embodiments of the aircraft engine systems may include a battery configured to store the electrical power and electrically connected to the fuel cell, wherein the system controller is further configured to direct the electrical power generated by the fuel cell to the battery to charge the battery.

In addition to one or more of the features described above, or as an alternative, embodiments of the aircraft engine systems may include that the system controller is configured to direct the electrical power to the battery in response to a determination that a current power capacity of the battery is below a threshold power capacity.

In addition to one or more of the features described above, or as an alternative, embodiments of the aircraft engine systems may include at least one heat exchanger arranged along the fuel supply line between the cryogenic fuel source and the burner and configured to heat the fuel.

In addition to one or more of the features described above, or as an alternative, embodiments of the aircraft engine systems may include at least one turbo expander arranged along the fuel supply line between the cryogenic fuel source and the burner and configured to expand the fuel.

In addition to one or more of the features described above, or as an alternative, embodiments of the aircraft engine systems may include at least one pump arranged along the fuel supply line between the cryogenic fuel source and the burner and configured to increase a pressure of the fuel.

In addition to one or more of the features described above, or as an alternative, embodiments of the aircraft engine systems may include at least one flow controller arranged along the fuel supply line, wherein the system controller is further configured to control the flow controller and prevent back pressure or back flow of fuel in the fuel supply line from reentering the cryogenic fuel source.

In addition to one or more of the features described above, or as an alternative, embodiments of the aircraft engine systems may include that the system controller is further configured to: determine a state of electrical power demand associated with at least one of the aircraft engine system or an aircraft associated with the aircraft engine system relative to a threshold power requirement; based on a determination that the state of the electrical power demand is associated with an electrical power requirement being above the threshold power requirement, direct the at least a portion of the excess fuel from the fuel supply line to the fuel cell to generate the electrical power; and based on a determination that the state of the electrical power demand is associated with the electrical power requirement being at or below the threshold power requirement, vent the excess fuel from the fuel supply line.

In addition to one or more of the features described above, or as an alternative, embodiments of the aircraft engine systems may include that the system controller is configured to: determine a state of electrical power demand associated with at least one of the aircraft engine system or an aircraft associated with the aircraft engine system relative to a threshold power requirement; based on a determination that the state of electrical power demand is associated with an electrical power requirement being above the threshold power requirement, direct the at least a portion of the excess fuel from the fuel supply line to the fuel cell to generate the electrical power; and based on a determination that the state of electrical power demand is associated with the electrical power requirement being at or below the threshold power requirement, direct the at least a portion of the excess fuel to a storage tank for temporary storage.

In addition to one or more of the features described above, or as an alternative, embodiments of the aircraft engine systems may include that the fuel is hydrogen.

According to some embodiments, methods of operating aircraft engine systems are provided. The aircraft engine systems include a core assembly and a fuel cell. The methods include selectively supplying a fuel from a cryogenic fuel source through a fuel supply line to a burner of the core assembly and to the fuel cell; determining if an amount of fuel in the fuel supply line is in excess of that necessary for operation of the core assembly; and based on a determination that excess fuel is present, directing at least a portion of the excess fuel from the fuel supply line to the fuel cell to generate electrical power.

In addition to one or more of the features described above, or as an alternative, embodiments of the methods may include that the aircraft engine system further comprises a battery electrically connected to the fuel cell and configured to store the electrical power, the method further comprising directing the electrical power generated by the fuel cell to the battery to charge the battery.

In addition to one or more of the features described above, or as an alternative, embodiments of the methods may include determining that a current power capacity of the battery is at or below a threshold power capacity, wherein the electrical power is directed to the battery based on a determination that the current power capacity of the battery is at or below the threshold power capacity.

In addition to one or more of the features described above, or as an alternative, embodiments of the methods may include passing the fuel through at least one heat exchanger arranged along the fuel supply line between the cryogenic fuel source and the burner to heat the fuel.

In addition to one or more of the features described above, or as an alternative, embodiments of the methods may include passing the fuel through at least one turbo expander arranged along the fuel supply line between the cryogenic fuel source and the burner to expand the fuel.

In addition to one or more of the features described above, or as an alternative, embodiments of the methods may include passing the fuel through at least one pump arranged along the fuel supply line between the cryogenic fuel source and the burner to increase a pressure of the fuel.

In addition to one or more of the features described above, or as an alternative, embodiments of the methods may include controlling a flow controller arranged along the fuel supply line to prevent back pressure or back flow of the fuel in the fuel supply line from reentering the cryogenic fuel source.

In addition to one or more of the features described above, or as an alternative, embodiments of the methods may include determining a state of electrical power demand associated with at least one of the aircraft engine system or an aircraft associated with the aircraft engine system relative to a threshold power requirement; based on a determination that the state of electrical power demand is associated with an electrical power requirement being above the threshold power requirement, directing the at least a portion of the excess fuel from the fuel supply line to the fuel cell; and based on a determination that the state of electrical power demand is associated with the electrical power requirement being at or below the threshold, venting the excess fuel from the fuel supply line.

In addition to one or more of the features described above, or as an alternative, embodiments of the methods may include determining a state of electrical power demand associated with at least one of the aircraft engine system or an aircraft associated with the aircraft engine system relative to a threshold power requirement; based on a determination that the state of electrical power demand is associated with an electrical power requirement being above the threshold power requirement, directing the at least a portion of the excess fuel from the fuel supply line to the fuel cell; and based on a determination that the state of electrical power demand is associated with the electrical power requirement being at or below the threshold, directing the at least a portion of the excess fuel to a storage tank for temporary storage.

In addition to one or more of the features described above, or as an alternative, embodiments of the methods may include that the fuel is hydrogen.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
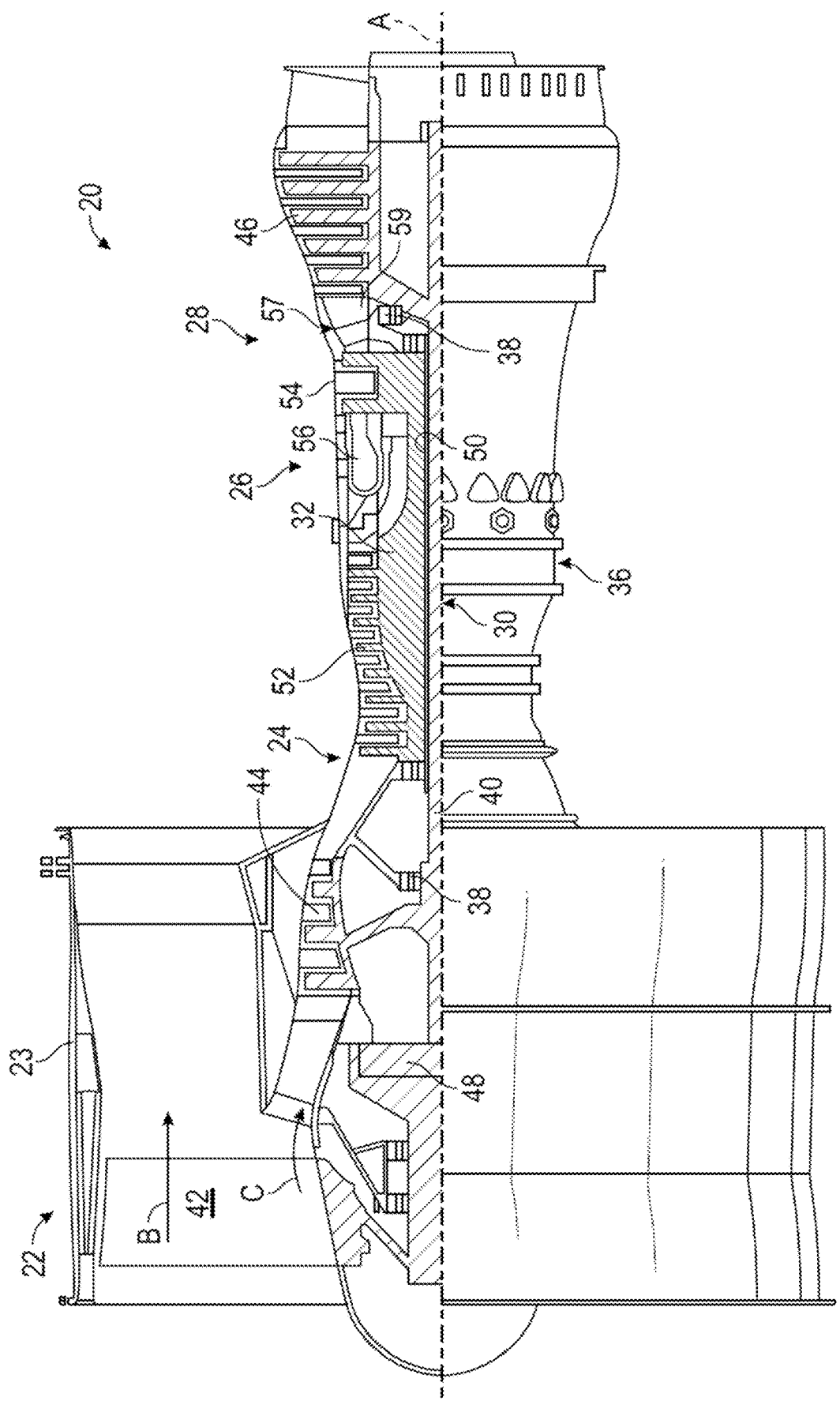
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a cold stream flow path B in a bypass duct defined in a fan case 23. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

Figure 2:
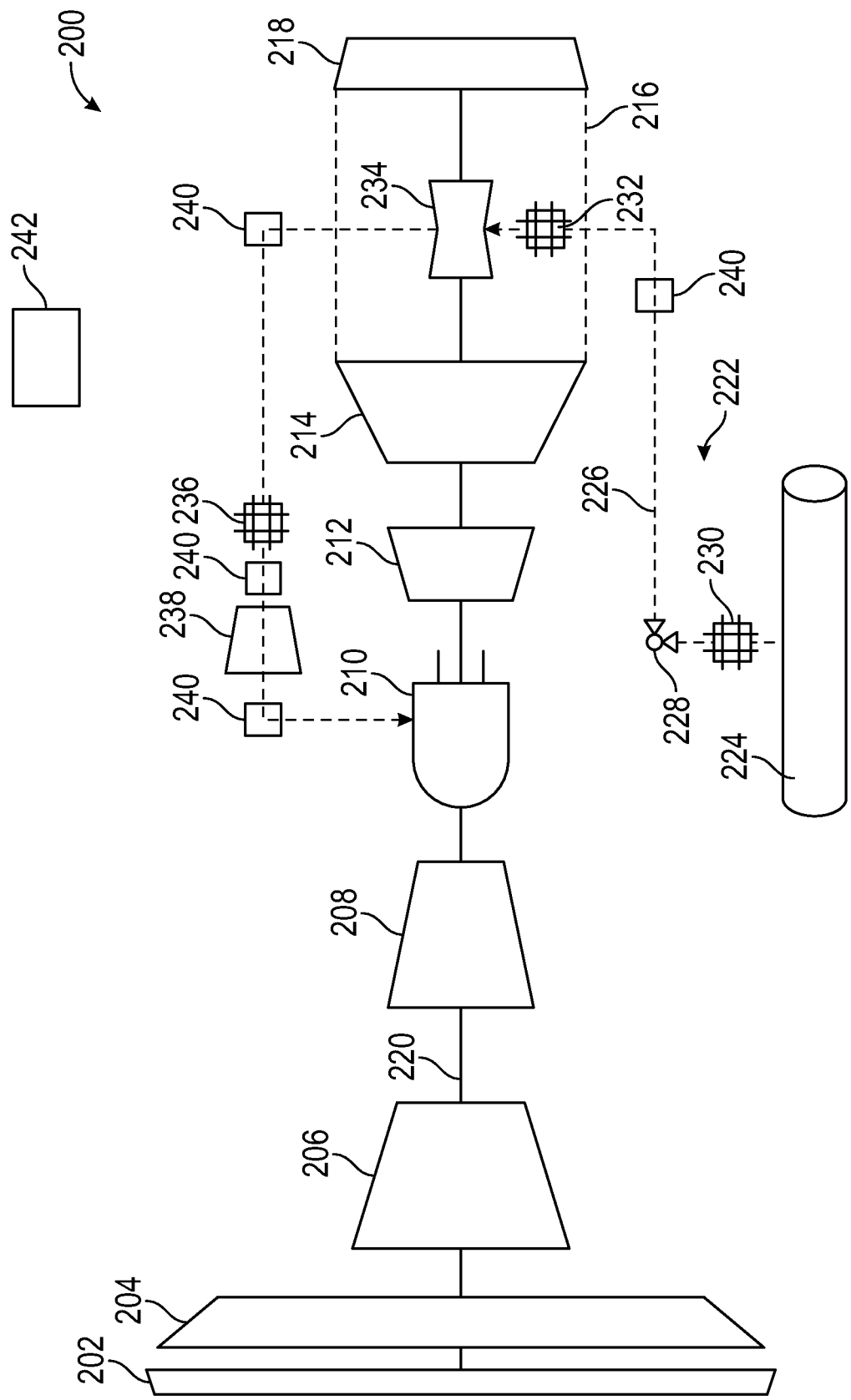
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as a cryogenic fuel, including but not limited to hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220.

As shown, the turbine engine system 200 includes a cryogenic fuel system 222. The cryogenic fuel system 222 is configured to supply a cryogenic fuel from a cryogenic fuel tank 224 to the combustor 210 for combustion thereof. In this illustrative embodiment, the cryogenic fuel may be supplied from the cryogenic fuel tank 224 to the combustor 210 through a fuel supply line 226. The fuel supply line 226 may be controlled by a flow controller 228 (e.g., pump(s), valve(s), or the like) that is arranged along the fuel supply line 226. The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the cryogenic fuel (e.g., liquid hydrogen) as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the cryogenic fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump, or other means to increase a pressure of the hydrogen sourced from the cryogenic fuel tank 224, may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchangers. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and, as the second working fluid provided via the optional secondary fluid circuit, may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art. In some embodiments, and as shown in FIG. 2, the output from the supplemental heating heat exchanger 236 may be passed into a turbo-expander 238 that expands the fuel prior to injection into the combustor 210. In some embodiments, one or the other of the supplemental heating heat exchanger 236 and the turbo-expander 238 may be omitted, depending on the thermal loads, needs, and configuration of the particular engine configuration and operation thereof. Further, the order and number of components along the flow supply line 226 may be varied depending on the specific engine configuration, operational requirements, etc., as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Downstream from the expansion turbine 234, in this embodiment, are the optional supplemental heating heat exchanger 236 and turbo-expander 238, which can further heat and/or expand the fuel prior to combustion. Because the hydrogen is heated from a cryogenic or liquid state in the cryogenic fuel tank 224 through the various mechanisms along the flow supply line 226, engine thermals may be improved.

The state of the fuel at various locations along the fuel supply line 226 may be monitored by one or more sensors 240. The sensors 240 may be distributed and/or positioned along the fuel supply line 226 to monitor or measure a state or property of the fuel within the fuel supply line 226. The flow controller 228 (and/or other flow control elements) may be operably controlled by a system controller 242. The system control 242 may be an electronic or computerized controller configured to control the fuel system, the engine, and/or parts of an aircraft. The system controller 242, in communication with the sensors 240, may be configured to monitor a pressure, temperature, flow rate, total volume, and the like.

As discussed above, as the fuel is passed along the flow supply line 226, the fuel will be heated from a cryogenic state (e.g., liquid) to a relatively hot state (e.g., gaseous or supercritical fluid). Because of this, conventional mechanisms for handling the fuel in the flow supply line 226 may not be viable. For example, in conventional fuel engines (e.g., jet fuel, hydrocarbon-based fuels, etc.), a return-to-tank process may be performed. Such return-to-tank may be performed where excess fuel that is still in the fuel lines at the time of, for example, engine shutdown or during transitions between fuel consumption loads. This is possible because the conventional fuel stays in the same state at all stages of supply, until it is combusted from liquid form. However, hydrogen-based aircraft engines will boil or vaporize the fuel before burning it. That is, the fuel is converted from the stored state (e.g., liquid) to a consumption state for combustion (e.g., gaseous or supercritical fluid). Because of both the temperature and potential phase/state change, returning the fuel back to a cryogenic tank requires additional energy input (e.g., to re-cool the fuel) and/or various additional components. Inclusion of such mechanism onboard an aircraft is not feasible due to weight, complexity, and for other reasons. In view of this, mechanisms for managing fuel in the flow supply lines of a cryogenic fuel system of an aircraft engine are provided by embodiments of the present disclosure.

Figure 3:
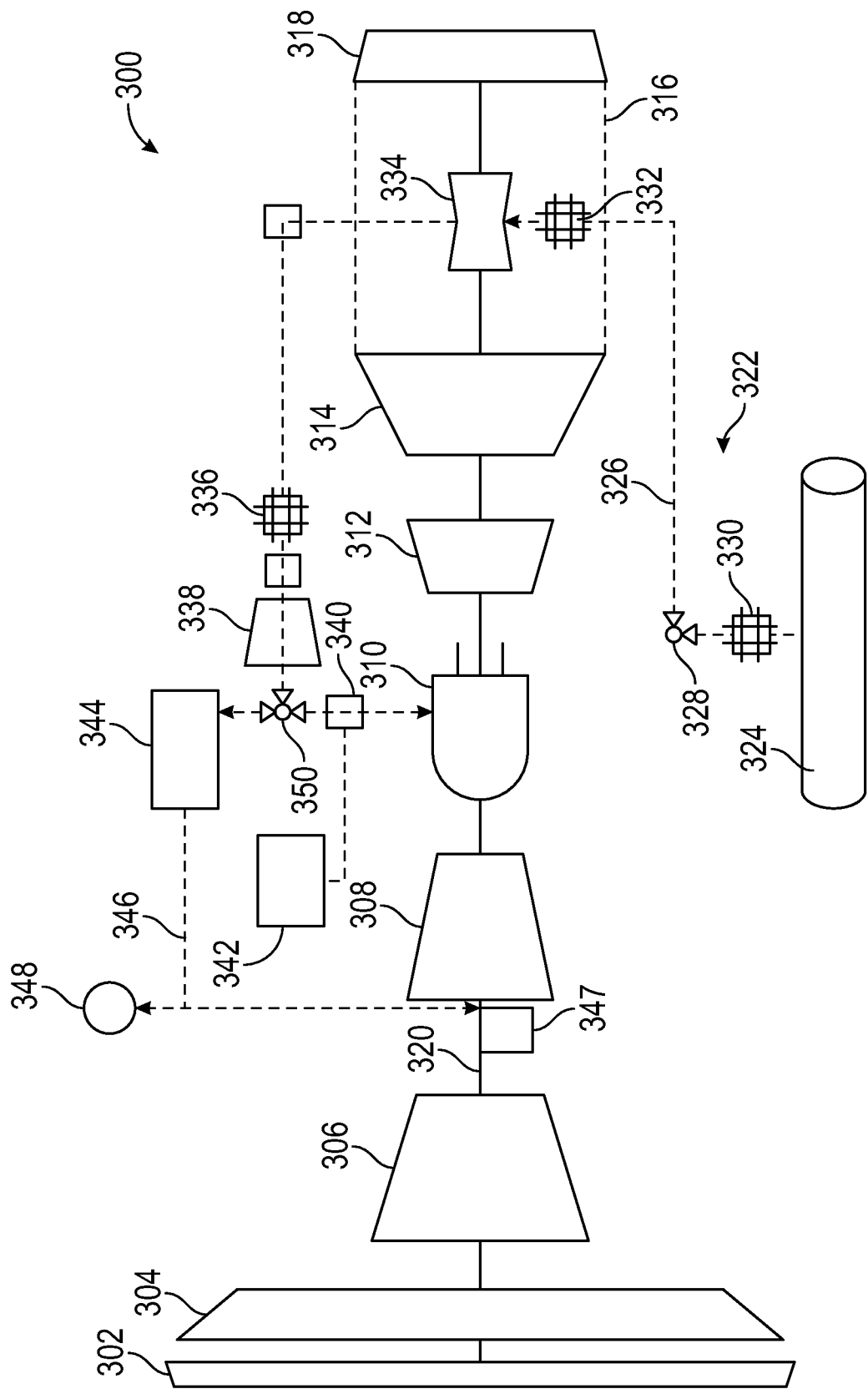
FIG. 3 is a schematic diagram of a turbine engine system that may incorporate embodiments of the present disclosure.

Turning now to FIG. 3, a schematic diagram of a turbine engine system 300 in accordance with an embodiment of the present disclosure is shown. The turbine engine system 300 may be similar to that shown and described above with respect to FIG. 2. The turbine engine system 300 includes an inlet 302, a fan 304, a low pressure compressor 306, a high pressure compressor 308, a combustor 310, a high pressure turbine 312, a low pressure turbine 314, a core nozzle 316, and an outlet 318. A core flow path is defined through, at least, a compressor section (306, 308), a turbine section (312, 314), and a combustor section (310). The fan (304), the compressor section (306, 308), the combustor section (310), and the turbine section (312, 314) are arranged along a shaft 320 and define a core assembly of the turbine engine system 300.

As shown, the turbine engine system 300 includes a cryogenic fuel system 322. The cryogenic fuel system 322 is configured to supply a cryogenic fuel from a cryogenic fuel tank 324 to the combustor 310 for combustion thereof. In this illustrative embodiment, the cryogenic fuel may be supplied from the cryogenic fuel tank 324 to the combustor 310 through a fuel supply line 326. The fuel supply line 326 may be controlled by a first flow controller 328 (e.g., pump(s), valve(s), or the like). The first flow controller 328 may be configured to control a flow through the fuel supply line 326 based on various criteria as will be appreciated by those of skill in the art. As shown, one or more heat exchangers 330, 332, 336 may be arranged along the fuel supply line 326, similar to that described above with respect to FIG. 2. Further, one or more expansion turbines 334, 338 may be arranged along the fuel supply line 326, similar to that described above. As such, the fuel (e.g., hydrogen sourced from a cryogenic state) may be heated and expanded along the fuel supply line 326 prior to injection into the combustor 310 for combustion.

In this illustrative embodiment, the turbine engine system 300 includes a fuel cell 344. The fuel cell 344 may be configured to generate electrical power for use by the turbine engine system 300 and/or components thereof. The fuel cell 344 may be a polymer electrolyte membrane fuel cell, a solid oxide fuel cell, or the like, that is configured to catalyze or otherwise convert hydrogen fuel into electrical energy. In some embodiments, the electrical power generated by the fuel cell 344 may be used for other purposes (alternatively or additionally), such as providing electrical power engine systems, aircraft systems, and the like. In some embodiments, the fuel cell 344 may be configured to generate electrical power to be stored in a battery or the like. As shown in FIG. 3, the fuel cell 344 may output electrical power through an electrical connection 346. The electrical power may be directed back into the turbine engine system 300, such as through a motor 347 or the like operably coupled to the engine shaft, to impart rotational power thereto. The electrical power may also (or alternatively) be directed to one or more electrical loads 348. The electrical loads 348 can include, without limitation, batteries, electrical components of the turbine engine system 300, electrical components of an aircraft, or the like. Further, batteries (e.g., electrical load 348) that are charged from the fuel cell 344 may be used to provide electrical power for the same purposes as the fuel cell 344.

The fuel cell 344 may be operably coupled to the fuel supply line 326 to receive fuel from the cryogenic fuel tank 324. That is, the fuel cell 344 may be configured to consume the same fuel as the combustor 310, and thus serve as a secondary consumer of the fuel. The fuel may be supplied to the fuel cell 344 through a second flow controller 350 arranged along the fuel supply line 326. The flow controllers 328, 350 may be operably controlled by a system controller 342 that may be in communication with one or more sensors 340 arranged along the fuel supply line 326 (e.g., as shown in FIG. 2). Those of skill in the art will appreciate that the system controller 342 and the sensors 340 may be arranged as shown in FIG. 2, or arranged in other configurations, without departing from the scope of the present disclosure.

The system controller 342 may be configured to monitor one or more properties of the fuel within the fuel supply line 326 (e.g., through information obtained from the one or more sensors 340). Additionally, the system controller 342 may be configured to control operation, actuation, and state of the flow controllers 328, 350 and thus control a flow of fuel through the fuel supply line 326 and to the fuel cell 344, the combustor 310, direct a flow of fuel to other systems of the engine or aircraft, and/or to dump or vent fuel overboard. As noted above, after the fuel has been extracted from the cryogenic fuel tank 324, the fuel will be heated and expanded. Because the cryogenic fuel tank 324 contains a fluid stored at cryogenic temperatures, it may be difficult, if not impossible, for extracted (e.g., heated, expanded) fuel from being sent back to the cryogenic fuel tank 324. This is because the state of the fuel after extraction changes, and returning the fuel back to the storage state (e.g., cryogenic temperatures) would require too much energy input to make the system feasible. However, the system controller 342 may be configured to redirect or control a flow of fuel such that fuel in the fuel supply line 326 may be used and consumed without the need to try to restore such fuel in the cryogenic fuel tank 324.

Figure 4:
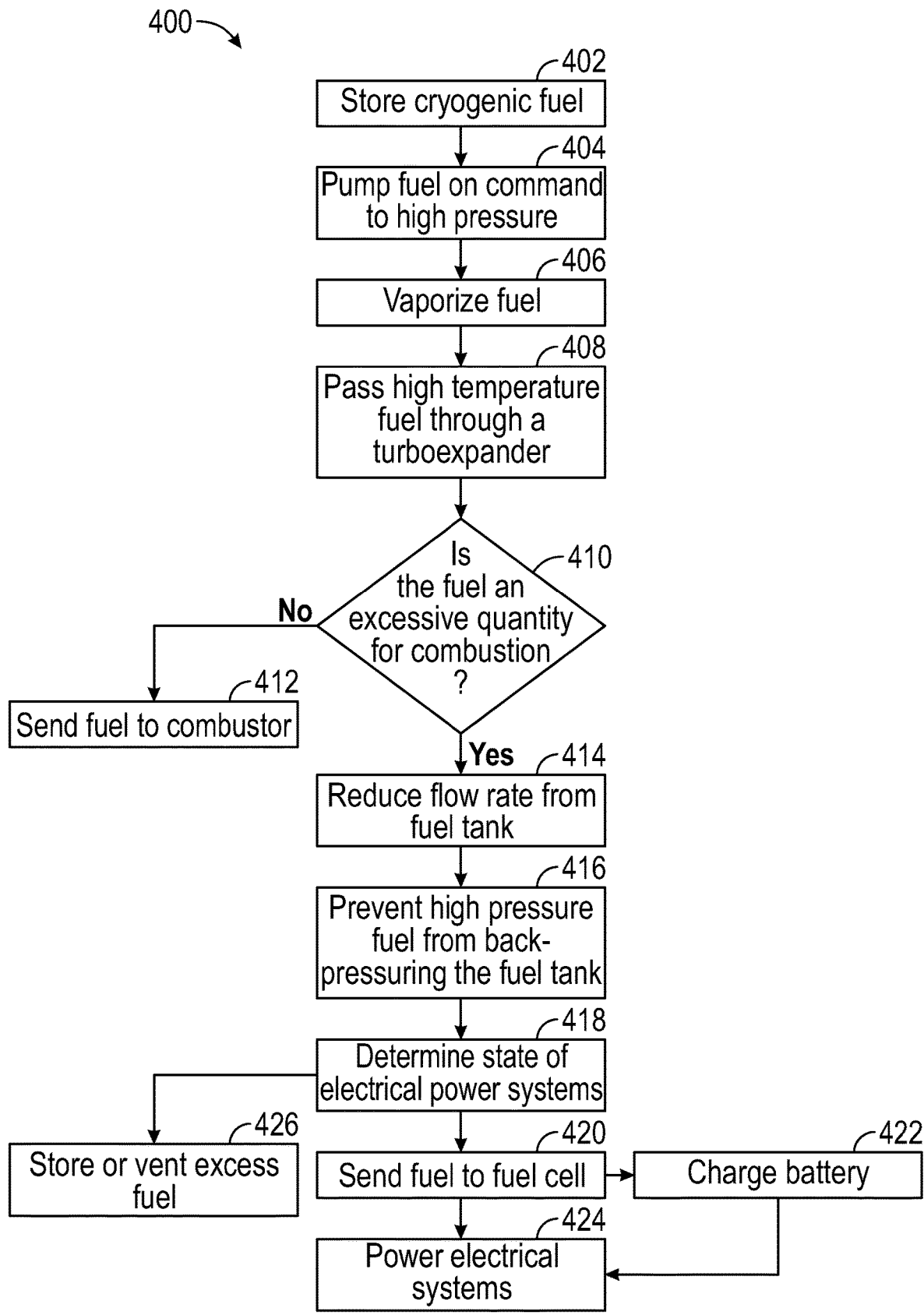
FIG. 4 is a flow process for operating a turbine engine system in accordance with an embodiment of the present disclosure.

For example, turning now to FIG. 4, a schematic flow process 400 in accordance with an embodiment of the present disclosure is shown. The flow process 400 may be performed with a system controller configured to monitor and control operation of a flow of fuel from a cryogenic fuel tank to a combustor of a turbine engine. The turbine engine may include a fuel cell and one or more electrical loads operably and electrically connected to the fuel cell. The fuel cell may be configured to receive a portion of fuel (e.g., from the cryogenic fuel tank) to generate electrical power. The electrical power may be distributed to one or more electrical loads, including, but not limited to, a battery, an electrical motor, powered electronics of the turbine engine and/or aircraft, electrical systems of the turbine engine and/or aircraft, and the like.

At block 402, cryogenic fuel is stored in a cryogenic fuel tank onboard an aircraft. The cryogenic fuel may be hydrogen (e.g., liquid hydrogen). The fuel may be configured to be supplied to a combustor of the turbine engine and/or the fuel cell.

At block 404, the fuel is extracted from the cryogenic fuel tank and pumped, on demand, to high pressure. The pressure increase of the fuel may be achieved through one or more pumps, for example, that are arranged along a fuel supply line. As used herein, the term "high pressure" refers to pressures of 250 PSI and greater, and, for example, between 250 PSI and 6,000 PSI.

At block 406, the high pressure fuel is boiled or vaporized to transition the fuel to a gaseous or supercritical state. The vaporization of the fuel may be achieved through waste heat pickup and/or use of one or more heat exchangers arranged along the fuel supply line.

At block 408, the vaporized and high pressure fuel is passed through a turboexpander to expand the fuel. It will be appreciated that one or more turbo expanders may be arranged along the fuel supply line, such as within a nozzle region of the turbine engine or elsewhere along the fuel supply line.

At block 410, the system controller in combination with one or more sensors determines if the fuel that has been pressurized, heated, and expanded, is in excess of that necessary for combustion. For example, excess fuel in the fuel supply line may be defined based on an estimated effect of the combustion of the hydrogen in question. For example, if the injection of the additional fuel causes an exceedance of thrust target or other limit parameter, such as an operability or temperature limit, then the fuel in the fuel line is in excess of that necessary for combustion and/or operation of the engine. Stated another way, "excess fuel" in the context of the present disclosure refers to amount of fuel that, if injected into the combustor, may cause limit parameters of the engine or aircraft to be exceeded. The amount of fuel within the fuel line may be determined using one or more sensors, such as pressure sensors, chemical or compound detectors, flow sensors, volume sensors, delta sensors configured to measure an amount at two different points along the flow line (e.g., at the first flow controller 328 compared with at the second flow controller 350), or the like. The control logic for determining fuel requirements and excess fuel in the fuel line may incorporate a controller and sensors operably coupled to the engine, the combustor, engine operation systems (e.g., FADEC), processors or other control units coupled to command input (e.g., inputs from a pilot), such that an active monitoring of the required engine performance output may be determined, in real time. This enables determination if the amount of fuel still in the fuel supply line is in excess of that required to perform at the commanded performance operation. For example, when a transition in a flight operation changes (e.g., from climb to cruise), the control logic may be configured to recognize such changes in flight operation. When the aircraft reaches cruise, the required fuel may be less than that during climb, and thus a reduction in fuel supply may be appropriate, as will be appreciated by those of skill in the art. However, because there is no conventional return-to-tank, the fuel in the fuel supply line cannot merely be returned to the cryogenic tank, but rather must be handled in an alternative fashion, without directing such excess into the combustor.

If, at block 410, it is determined that the fuel is not in excess of that required for combustion, the pressurized, heated, and expanded fuel is injected into a combustor for combustion, at block 412.

However, if it is determined at block 410, that the amount of fuel is in excess of that necessary for combustion, then the system controller will control a flow controller to reduce a flow rate from the fuel tank, at block 414.

Further, at block 416, when the amount of fuel is in excess of that necessary for combustion, the system controller may control a flow controller (e.g., the same or different from the flow controller used at block 414) to prevent the high pressure fuel from back-pressuring the fuel tank. That is, the system controller will prevent the non-cryogenic fuel from reentering the fuel tank. At the block 416, there will be a portion of fuel that has not reached the combustor and thus has not yet been consumed, but is in excess of that necessary for combustion. As such, there is excess fuel within the fuel supply line.

At block 418, the system controller (e.g., in communication with one or more sensors or the like, such as communication lines with other components) will determine a state of electrical power demand of the engine and/or an aircraft associated with the engine. The determination of need for electrical power (e.g., electrical power demand), at block 418, may be to determine a capacity state of a battery, determination of whether electrical power can be or is needed onboard the engine or aircraft for powering one or more components or systems, determination that extra energy should be input into an engine shaft (e.g., power assist to engine shaft), or the like. That is, the system controller may determine or evaluate electrical load needs of the engine and/or the aircraft and determine if electrical power should be generated and distributed to one or more systems of the engine and/or aircraft. Such electrical load needs can be related to capacity of a battery or other electrical storage device/system, generation of electrical power for onboard uses, monitoring power output of an onboard generator (e.g., coupled to the engine or separate therefrom), and the like. In some instances, for example for already existing electrical power generation onboard the aircraft (e.g., generator), the fuel cell may be used to supplement or replace such alternative electricity generation, reducing run time of such other electrical power generation systems.

The determination at block 418 may be a determination of a state of electrical power demand associated with at least one of the aircraft engine system or an aircraft associated with the aircraft engine system relative to a threshold power requirement. The threshold power requirement may represent a threshold indicative of requiring more power to be provided to the one or more systems. As such, if a demand state is above the threshold power requirement, then additional power is required, and if the demand state is at or below the threshold power requirement, no additional power is required.

If it is determined that there is need for electrical power at block 418 (e.g., demand state is above threshold power requirement), the system controller will proceed to block 420. The system controller will direct at least a portion of the excess fuel within the fuel supply line to a fuel cell. The fuel cell may be configured to receive the fuel and convert such fuel into electrical energy. The electrical energy generated at block 420 may be used for various purposes onboard the engine and/or aircraft, as described above.

For example, at block 422, if a battery is present onboard the aircraft and/or engine and is at less then a predetermined capacity, then electrical power may be provided or directed to the battery to charge the battery. For example, in some embodiments, the system controller may determine (e.g., through direct communication or from other sources) that the battery is at less-than-full capacity or below a threshold power capacity. If the battery is at less-than-full capacity, then some or all of the electrical power generated by the fuel cell at block 420 may be directed to the battery to charge the battery to full capacity or to other preset capacity level above the threshold power capacity. It will be appreciated that the threshold for charging the battery may be something other than full-capacity (e.g., 100% capacity). For example, the battery charging of block 422 may be performed only when the battery is at 90% or lower capacity, 80% or lower capacity, or some other threshold capacity value. This threshold capacity value may be determined based on the specific battery configuration and composition and requirements thereof, as will be appreciated by those of skill in the art. The battery may then be used to power electrical systems of the aircraft/engine, similar to the fuel cell or other electrical power sources onboard the engine/aircraft.

If the battery is at capacity (or above the threshold capacity), the electrical energy generated by the fuel cell at block 420 may be directed to other electrical components or electrical loads of the engine/aircraft, at block 424. Such electrical loads may include, without limitation, power electronics of the engine/aircraft and/or an electric motor operably coupled to an engine shaft to impart supplemental rotational energy into the engine shaft. It will be appreciated that depending on demand needs from these other loads, these loads may be supplied with electrical power before a battery is charged (even if such battery is below a threshold capacity). That is, the order of power generation and supply may be varied from application to application and may depend on the specific electrical power needs at the time that the fuel cell generates the electrical power.

If, at block 418, it is determined that there is no required electrical power to be generated (e.g., an electrical power requirement of the engine system and/or the aircraft electrical system is equal to or less than the threshold power requirement), the system controller may cause the excess fuel within the fuel supply line to be stored, vented, or dumped overboard from the engine at block 426. Because the fuel is hydrogen, direct atmospheric venting is possible without additional treatment. Alternatively, rather than dumping the gaseous or supercritical fuel, in some embodiments, a temporary holding tank may be used to store the fuel in this state (e.g., gaseous or supercritical) for a period of time. This temporary storage tank may be relatively small to only hold a capacity of the fuel supply line. Advantageously, this stored fuel may be used for reignition of the engine, if necessary or for later use by the fuel cell or the like.

In some embodiments, the excess fuel may be recondensed to a liquid or cryogenic state and reintroduced into the tank or may be stored in a secondary cryogenic or cold holding tank. That is, the excess fuel may be rechilled by a cryocooler or the like, to recondense the fuel to a liquid state. Further, in some embodiments, the secondary storage may be configured as a gaseous fuel buffer system, and thus may not be a tank but a modified section of piping or of the fuel supply line that is configured to buffer the fuel in instances when there is excess over combustion capacity and/or electrical needs. It will be appreciated that a rechilling process may require power input, and thus a combination of steps may be performed, such as directing a portion of fuel to the fuel cell to generate electrical power, which is then used to power a chiller which is configured to chill another portion of the fuel. This fuel can then be pumped to the original fuel tank or secondary tank, using electrical power generated by the fuel cell.

In some embodiments, the operations of blocks 418-426 may be implemented as a determination of a state of electrical power demand associated with at least one of the aircraft engine system or an aircraft associated with the aircraft engine system relative to a threshold power requirement. Based on a determination that the state of the electrical power demand is associated with an electrical power requirement being above the threshold power requirement, the system will direct at least a portion of the excess fuel from the fuel supply line to the fuel cell to generate the electrical power. The generated electrical power may be directed to batteries or electrical systems and/or components of the engine and/or aircraft. Based on a determination that the state of the electrical power demand is associated with the electrical power requirement being at or below the threshold power requirement, the system will vent the excess fuel from the fuel supply line and/or store at least a portion thereof in a storage container or the like. It will be appreciated that if the excess fuel is sufficient to fill such a storage container, and there is some amount still remaining in the fuel line, the system may then vent the remainder of the fuel to ambient.

Flow process 400 provides an alternative or replacement for return-to-tank systems of convention fuel engines. Because of the nature of cryogenic fuels, the fuel, after extraction and partial processing (e.g., heating, expanding, pressurizing, etc.) cannot be reintroduced into the storage tank. However, in accordance with embodiments of the present disclosure, the fuel that is in the fuel supply line that will not be combusted can be re-purposed and directed to other uses, such as to generate electrical power in a fuel cell or the like. If it is determined that no such electrical power is needed, then the fuel may be stored or vented or dumped overboard. If the electrical power is stored in a battery, the battery may then be used to supply power to electrical components or systems at a later time (e.g., power electronics, electrical systems, and/or an electric motor).

Advantageously, in accordance with embodiments of the present disclosure, aircraft engines that use alternative fuel sources (e.g., cryogenic fuels, such as hydrogen) are provided with mechanisms for addressing fuel that is extracted from a fuel tank but cannot be combusted. Rather than return-to-tank systems, some embodiments of the present disclosure are configured to capitalize upon the excess fuel and use it for other purposes, such as generating electrical power in a fuel cell and/or charging a battery or the like. In some embodiments, a return-to-tank may be possible by use of a chiller or the like, where the fuel may be rechilled and stored (either in the original storage tank or some other storage tank).

As used herein, the terms "about" and "substantially" are intended to include the degree of error associated with measurement of the particular quantity based upon the equipment available at the time of filing the application. For example, "about" or "substantially" may include a range of ±8%, or 5%, or 2% of a given value or other percentage change as will be appreciated by those of skill in the art for the particular measurement and/or dimensions referred to herein. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:
1. An aircraft engine system, comprising:
  a core assembly comprising a compressor section, a combustor section, and a turbine section arranged along a shaft, with a core flow path through the core assembly such that exhaust from the combustor section passes through the turbine section and exits through a nozzle;
  a fuel cell configured to generate electrical power;
  a cryogenic fuel source configured to supply a fuel through a fuel supply line to each of the combustor section for combustion and the fuel cell for reaction to generate the electrical power;
  a battery electrically connected to the fuel cell and configured to store electrical power; and a system controller configured to selectively direct the fuel from the cryogenic fuel source to each of the combustor section and the fuel cell, wherein the system controller is configured to:
- determine a state of electrical power demand associated with at least one of the aircraft engine system or an aircraft associated with the aircraft engine system relative to a threshold power requirement;
- determine a current power capacity of the battery;
- determine if an amount of fuel in the fuel supply line is in excess of that necessary for operation of the core assembly; based on a determination that excess fuel is present, the system controller is configured to direct at least a portion of the excess fuel from the fuel supply line to the fuel cell to generate the electrical power;
- based on a determination that the state of the electrical power demand is above the threshold power requirement, direct at least a portion of the generated electrical power to the respective aircraft engine system or aircraft;
- based on a determination that a current power capacity of the battery is below a threshold power capacity, direct at least a portion of the generated electrical power to the battery to charge the battery; and
- based on a determination that the state of the electrical power demand is at or below the threshold power requirement and a determination that the current power capacity of the battery is at or above the threshold power capacity, vent the excess fuel from the fuel supply line.

2. The aircraft engine system of claim 1, further comprising at least one heat exchanger arranged along the fuel supply line between the cryogenic fuel source and the combustor section and configured to heat the fuel.

3. The aircraft engine system of claim 1, further comprising at least one turbo expander arranged along the fuel supply line between the cryogenic fuel source and the combustor section and configured to expand the fuel.

4. The aircraft engine system of claim 1, further comprising at least one pump arranged along the fuel supply line between the cryogenic fuel source and the combustor section and configured to increase a pressure of the fuel.

5. The aircraft engine system of claim 1, further comprising at least one flow controller arranged along the fuel supply line, wherein the system controller is further configured to control the flow controller and prevent back pressure or back flow of fuel in the fuel supply line from reentering the cryogenic fuel source.

6. The aircraft engine system of claim 1, wherein
the venting of the excess fuel from the fuel supply line comprises venting the excess fuel out of the fuel supply line and into a storage tank for temporary storage.

7. The aircraft engine system of claim 1, wherein the fuel is hydrogen.

8. A method of operating an aircraft engine system, the aircraft engine system comprising a core assembly, a fuel cell, a battery, and a system controller, the method comprising:
- selectively supplying a fuel from a cryogenic fuel source through a fuel supply line to a combustor of the core assembly and to the fuel cell;
- determining a state of electrical power demand associated with at least one of the core assembly or an aircraft associated with the core assembly relative to a threshold power requirement;
- determining a current power capacity of the battery;
- determining if an amount of fuel in the fuel supply line is in excess of that necessary for operation of the core assembly;
- based on a determination that excess fuel is present, directing at least a portion of the excess fuel from the fuel supply line to the fuel cell to generate electrical power;
- based on a determination that the state of the electrical power demand is above the threshold power requirement, directing at least a portion of the generated electrical power to the respective core assembly or aircraft;
- based on a determination that a current power capacity of the battery is below a threshold power capacity, direct at least a portion of the generated electrical power to the battery to charge the battery; and
- based on a determination that the state of the electrical power demand is at or below the threshold power requirement and a determination that the current power capacity of the battery is at or above the threshold power capacity, venting the excess fuel from the fuel supply line.

9. The method of claim 8, further comprising passing the fuel through at least one heat exchanger arranged along the fuel supply line between the cryogenic fuel source and the combustor to heat the fuel.

10. The method of claim 8, further comprising passing the fuel through at least one turbo expander arranged along the fuel supply line between the cryogenic fuel source and the combustor to expand the fuel.

11. The method of claim 8, further comprising passing the fuel through at least one pump arranged along the fuel supply line between the cryogenic fuel source and the combustor to increase a pressure of the fuel.

12. The method of claim 8, further comprising controlling a flow controller arranged along the fuel supply line to prevent back pressure or back flow of the fuel in the fuel supply line from reentering the cryogenic fuel source.

13. The method of claim 8,
wherein the venting of the excess fuel from the fuel supply line comprises venting of the excess fuel out of the fuel supply line and into a storage tank for temporary storage.

14. The method of claim 8, wherein the fuel is hydrogen.

* * * * *